(12) United States Patent
Touhsaent

(10) Patent No.: US 6,444,750 B1
(45) Date of Patent: Sep. 3, 2002

(54) PVOH-BASED COATING SOLUTIONS

(75) Inventor: Robert E. Touhsaent, Fairport, NY (US)

(73) Assignee: ExxonMobil Oil Corp., Fairfax, VA (US)

( * ) Notice: Subject to any disclaimer, the term of this patent is extended or adjusted under 35 U.S.C. 154(b) by 0 days.

(21) Appl. No.: 08/399,384

(22) Filed: Mar. 6, 1995

(51) Int. Cl.$^7$ ............................................... C08L 29/04
(52) U.S. Cl. ...................... 525/58; 427/316; 427/372.2; 427/393.5; 427/536; 427/569; 428/502; 428/515; 428/516; 428/524; 524/503; 525/417
(58) Field of Search .................. 525/417, 58; 524/503; 427/316, 372.2, 393.5, 536, 569; 428/502, 515, 516, 524

(56) References Cited

U.S. PATENT DOCUMENTS

| | | |
|---|---|---|
| 2,130,212 A | 9/1938 | Watkins |
| 2,333,796 A | 11/1943 | Kenyon et al. |
| 2,362,026 A | 11/1944 | Quist |
| 2,419,281 A | 4/1947 | Noble |
| 2,897,092 A | 7/1959 | Miller |
| 2,916,468 A | 12/1959 | Yundt |
| 3,033,842 A | 5/1962 | Holtschmidt |
| 3,099,646 A | 7/1963 | Scardiglia et al. |
| 3,221,079 A | 11/1965 | Harris |
| 3,232,916 A | 2/1966 | Fogle |
| 3,275,575 A | 9/1966 | Fogle |
| 3,282,729 A | 11/1966 | Richardson |
| 3,294,577 A | 12/1966 | Mayer |
| 3,518,242 A | 6/1970 | Chrisp |
| 3,630,831 A * | 12/1971 | Jongetjes .................... 162/156 |
| 3,702,844 A | 11/1972 | Ofstead et al. |
| 3,719,621 A | 3/1973 | Vogt et al. |
| 4,154,912 A | 5/1979 | Philipp et al. |
| 4,214,039 A | 7/1980 | Steiner et al. |
| 4,224,262 A | 9/1980 | Baird, Jr. et al. |
| 4,235,365 A | 11/1980 | Yoshii et al. |
| 4,240,993 A | 12/1980 | Sun |
| 4,254,169 A | 3/1981 | Schroeder |
| 4,262,067 A | 4/1981 | Phillipp et al. |
| 4,272,470 A | 6/1981 | Hsu et al. |
| 4,275,119 A | 6/1981 | Weiner |
| 4,276,330 A | 6/1981 | Stanley et al. |
| 4,277,572 A | 7/1981 | Fujiwara et al. |
| 4,284,671 A | 8/1981 | Cancio et al. |
| 4,288,477 A | 9/1981 | Bordini et al. |
| 4,357,402 A | 11/1982 | Sheibley et al. |
| 4,376,183 A | 3/1983 | Haskell |
| 4,416,938 A | 11/1983 | Haskell |
| 4,439,493 A | 3/1984 | Hein et al. |
| 4,461,858 A * | 7/1984 | Adelman ..................... 524/47 |
| 4,475,241 A | 10/1984 | Mueller et al. |
| 4,564,559 A | 1/1986 | Wagner, Jr. et al. |
| 4,650,721 A | 3/1987 | Ashcraft |
| 4,725,646 A | 2/1988 | Kobashi et al. |
| 4,785,049 A | 11/1988 | Balaba et al. |
| 4,927,689 A | 5/1990 | Markiewicz |
| 5,061,387 A * | 10/1991 | Victorius ................. 252/8.554 |
| 5,102,699 A | 4/1992 | Beeson et al. |
| 5,230,963 A | 7/1993 | Knoerzer |
| 5,330,831 A | 7/1994 | Knoerzer et al. |
| 5,380,586 A * | 1/1995 | Knoerzer et al. ........... 428/349 |
| 5,487,940 A * | 1/1996 | Bianchini et al. ........... 428/349 |

OTHER PUBLICATIONS

T.W. Modi, *Polyvinyl Alcohol*, in Handbook of Water–Soluble Gums and Resins 20.1–20.32 (Robert L. Davidson ed., 1980).

Harold L. Jaffe and Franklin M. Rosenblum, *Poly(Vinyl Alcohol) for Adhesives*, in Handbook of Adhesives 401–407 (Irving Skeist ed., 1990).

\* cited by examiner

*Primary Examiner*—Judy M. Reddick
(74) *Attorney, Agent, or Firm*—Dennis P. Santini; Rick F. James

(57) ABSTRACT

An improved PVOH-based coating solution for application to a polymeric substrate. The coating solution includes poly(vinyl alcohol), a formaldehyde-containing crosslinking agent and a crosslinking-promoting acid catalyst which lowers the pH of the solution to about 3.5 or less and, preferably, to about 3 or less. The coating solution exhibits improved viscosity stability, particularly with the addition of a second acid catalyst. The coating solution also provides improved crosslinking and oxygen barrier characteristics upon drying.

11 Claims, No Drawings

PVOH-BASED COATING SOLUTIONS

BACKGROUND OF THE INVENTION

The present invention relates to PVOH-based coatings and, more particularly, to improved PVOH-based coating solutions which provide improved viscosity stability, and improved crosslinking and oxygen barriers characteristic upon drying.

Poly(vinyl alcohol) ("PVOH") coatings have been applied to various substrates in the past, and are known to provide a barrier to the transmission of oxygen. PVOH, however, is soluble in water and therefore is susceptible to attack by moisture. Various attempts have been made to decrease the sensitivity of PVOH to moisture.

One known method of decreasing the sensitivity of the PVOH coating to moisture is to crosslink the poly(vinyl alcohol). For example, a crosslinking agent, e.g., glyoxal, urea formaldehyde, melamine formaldehyde, may be applied along with the poly(vinyl alcohol) such that the agent interconnects and thereby crosslinks the poly(vinyl alcohol) molecules as such coating is dried. An acid catalyst is typically employed with the formaldehyde-containing crosslinkers to facilitate the crosslinking process. The ph of the solution including the acid catalyst is generally about 4.5 to 6.5.

However, it can be difficult in the prior art films to ensure that the layer of poly(vinyl alcohol) crosslinks fully throughout itself. In this regard, it is believed that the degree of crosslinking is indicative of the oxygen barrier characteristics of the resultant film. Stated differently, poly(vinyl alcohol) layers that are fully crosslinked tend to exhibit better barrier characteristics than those layers which are less than fully crosslinked. Of course, fully crosslinked PVOH layers are also more resistant to rubbing.

Glyoxal, although generally providing good crosslinking, even without the need of a catalyst, has been found to cause yellowing of the resultant film when such film is printed with white acrylic water-based ink systems, while PVOH coatings employing formaldehyde-containing crosslinkers have generally suffered from slow curing and short pot life.

Thus, films employing formaldehyde-containing crosslinkers, in an attempt to achieve maximum crosslinking, are often dried and/or stored for an extended period of time. For example, it may be necessary to store a film for weeks, or even months, before such film has reached its point of maximum crosslinking. The aforementioned storage period increases the production time and cost for manufacturing polymeric films having crosslinked PVOH coatings thereon. Attempts to facilitate the crosslinking process with films employing formaldehyde-containing crosslinkers have generally been unsuccessful.

There is therefore a need in the art for a PVOH-based coating solution employing a formaldehyde-containing crosslinker which exhibits improved viscosity stability, and which after application to a polymeric substrate and upon drying, is substantially 100% crosslinked thereby eliminating or, at the minimum, greatly reducing the storage period. Finally, the resultant coating should exhibit improved oxygen barrier characteristics.

SUMMARY OF THE INVENTION

The present invention, which addresses the needs of the prior art, relates to an improved coating solution for application to a polymeric substrate. The solution exhibits improved viscosity stability and provides improved crosslinking and oxygen barrier characteristics upon drying. The coating solution includes poly(vinyl alcohol), formaldehyde-containing crosslinking agent and crosslinking-promoting acid catalyst. The solution has a pH of about 3.5 or less. In one preferred embodiment, the solution has a pH of about 3 or less and the acid catalyst is selected from the group consisting of phosphoric acid, nitric acid, hydrochloric acid and maleic acid. In one particularly preferred embodiment, the solution includes a second acid catalyst selected from the group consisting of citric acid, maleic acid and lactic acid.

The present invention also relates to a polymeric film structure having an enhanced oxygen barrier produced by the process of coating at least one side of a polymeric substrate adapted for receipt of an oxygen barrier with a solution of polyvinyl alcohol, formaldehyde-containing crosslinking agent and crosslinking-promoting acid catalyst wherein the solution has a pH of about 3.5 or less. In one preferred embodiment, the solution has a pH of about 3 or less and the acid catalyst is selected from the group consisting of phosphoric acid, nitric acid, hydrochloric acid and maleic acid. In one particularly preferred embodiment, the solution includes a second acid catalyst selected from the group consisting of citric acid, maleic acid and lactic acid.

The present invention also relates to a method of producing a film structure having an enhanced oxygen barrier layer adhered thereto. The method includes the step of coating at least one side of a polymeric substrate adapted for receipt of an oxygen barrier with a solution of polyvinyl alcohol, formaldehyde-containing crosslinking agent and crosslinking-promoting acid catalyst wherein the solution has a pH of about 3.5 or less. In one preferred embodiment, the solution has a pH of about 3 or less and the acid catalyst is selected from the group consisting of phosphoric acid, nitric acid, hydrochloric acid and maleic acid. In one particularly preferred embodiment, the solution includes a second acid catalyst selected from the group consisting of citric acid, maleic acid and lactic acid.

As a result, the present invention provides a coating solution wherein the resultant PVOH layer is substantially 100% crosslinked upon drying thereof. The resultant crosslinked PVOH layer exhibits improved oxygen barrier characteristics. The use of a formaldehyde-containing crosslinking, rather than a crosslinker such as glyoxal, eliminates any drawbacks associated with the use of white acrylic water-based ink systems for printing. Finally, the coating solutions of the present invention exhibit improved viscosity stability.

DETAILED DESCRIPTION OF THE INVENTION

The films of the present invention are produced by coating at least one side of a substrate with a solution of poly(vinyl alcohol), a formaldehyde-containing crosslinking agent and a crosslinking-promoting acid catalyst. The solution has a pH of about 3.5 or less and, preferably, about 3 or less,. The poly(vinyl alcohol) thereafter crosslinks to provide an oxygen barrier, i.e., a polymeric layer which resists the transmission of oxygen therethrough.

The improved oxygen barrier layer of the present invention may be adhered to any number of substrates, including polymeric films, boxboards, metallic films and paper. The oxygen barrier layer is preferably adhered to a polymeric film such as a polyolefin. One particularly preferred polyolefin is polypropylene.

To ensure that the oxygen barrier layer of the present invention properly adheres to the substrate, the substrate preferably includes at least one side that is adapted for receipt of the layer. Particularly, the side of the substrate to be coated should have surface properties which facilitate the securing of a polylvinyl alcohol) layer thereto. For example, the side to be coated may be treated with corona discharge and/or a primer such as poly(ethyleneimine). Of course, other suitable primers may also be utilized. The side to be coated may also be adapted for subsequent receipt of a poly(vinyl alcohol) layer during formation of the substrate itself. For example, a polymeric substrate, e.g., polypropylene, may include a material such as maleic acid which improves the ability of poly(vinyl alcohol) to bond thereto. Finally, the substrate may include a side which is naturally adapted for receipt of a poly(vinyl alcohol) layer, i.e., the side to be coated requires no treatment.

Although polylvinyl alcohol) provides a barrier to the transmission of oxygen, it is soluble in water and therefore susceptible to attack by moisture. As a result, poly(vinyl alcohol) layers which will be exposed to moisture are typically crosslinked. The crosslinking of the layer substantially reduces its susceptibility to attack by moisture and is also believed to increase the resistance of such layer to transmission of oxygen.

However, it is often difficult to readily and consistently produce a poly(vinyl alcohol) layer employing a formaldehyde-containing crosslinker which, when dried, becomes fully crosslinked. The current procedure for producing oxygen barriers of poly(vinyl alcohol) often requires the film to be stored for a period of weeks, or even months, following manufacture of the film to allow the poly(vinyl alcohol) layer to fully crosslink. This storage requirement increases both the production cost and production time. It also results in the film being exposed to moisture prior to becoming fully crosslinked, a condition which may negatively affect the final properties of the film.

It has been discovered herein that a formulation of poly (vinyl alcohol), melamine formaldehyde and a crosslinking-promoting acid catalyst wherein the coating solution has a pH of about 3.5 or less, and preferably about 3 or less, exhibits improved crosslinking characteristics upon drying of the applied coating, thereby eliminating, or at the minimum reducing, the need to store the film. This crosslinking also results in an improved oxygen barrier, as compared to other crosslinked PVOH coatings employing formaldehyde or non-formaldehyde crosslinkers.

The poly(vinyl alcohol) is preferably a low viscosity superhydrolyzed PVOH such as Elvanol® 90-50 (produced by DuPont). A low molecular weight PVOH includes relatively small PVOH molecules, thereby providing a PVOH formulation having a lower initial viscosity. However, it is contemplated that other commercially available poly(vinyl alcohol), e.g., Elvanol® 7130 (also produced by DuPont), would exhibit similarly improved characteristics.

The crosslinking agent is preferably a melamine formaldehyde such as Parez 707 (produced by Cytec) or Cymel.385 (also produced by Cytec), although other melamine formaldehyde crosslinkers such as Cymel 373 (also produced by Cytec), together with other formaldehyde-containing crosslinkers, are contemplated.

The solution, which is preferably aqueous, is prepared by adding the poly(vinyl alcohol) to cold water, which is thereafter heated to a temperature sufficient to dissolve the PVOH. The water and dissolved PVOH are then cooled. The crosslinking agent is then added to the cooled PVOH and water. Thereafter, an effective amount of crosslinking-promoting acid catalyst is added to the solution to lower the pH of the solution to about 3.5 or less, and preferably, about 3.0 or less. It is this resultant solution that is then coated on the polymeric substrate.

It has been discovered herein that particular acids, such as phosphoric acid, nitric acid, hydrochloric acid and maleic acid, unexpectedly promote the crosslinking of the PVOH upon drying thereof when the solution pH is about 3.5 or less and, preferably, about 3 or less. This is particularly significant since certain other acid catalysts provide effectively no increase in crosslinking at solution pHs of 3.5 and below, and, in fact, may actually hinder the crosslinking process.

For example, acids such as sulfuric acid, tartaric acid and N-phuric acid provide effectively no increase in crosslinking at solution pHs of about 3.5 or less. Acids such as sulfuric acid are believed to actually hinder the crosslinking process at solution pHs of about 3.5 or less. According, it is contemplated herein that the term crosslinking-promoting acid catalyst includes those acids identified above as promoting crosslinking at solution pHs of about 3.5 or less, together with other acids which also promote crosslinking of PVOH and formaldehyde-containing crosslinkers at solution pHs of about 3.5 or less.

In one preferred embodiment, a second acid, preferably an organic acid such as citric, maleic or lactic, is added to the coating solution. This second acid is added to the solution at a concentration of about 1 pph to about 15 pph and, preferably, at a concentration of about 5 pph to about 10 pph of PVOH. The inclusion of the second acid in the coating solution is believed to provide a number of advantages, including improved oxygen barrier characteristics of the crosslinked coating and improved viscosity stability, particularly at higher levels of solid in solution. The inclusion of the second acid is also believed to buffer the ph of the solution. Of course, it is contemplated herein that the invention encompasses other second acids in addition to the above-identified organic acids which when added to the solution provide the aforementioned properties.

With respect to manufacture of polymeric films for use in the food packaging industry, phosphoric acid and citric acid are particularly preferred in that such acids are generally recognized as safe (GRAS) for use.

As mentioned, it has been discovered that the aqueous solution of the present invention has improved viscosity stability, in comparison to prior art formulations. This viscosity stability is particularly apparent in solutions that have aged for a relatively long period of time, e.g., 20 hours. The stability is even further enhanced by the addition of the second acid to the coating solution, especially at higher levels of solid concentrations. The viscosity stability facilitates the coating process by providing longer pot life of the coating solution, improved control of coating weight during the actual coating process and reduced foam during the coating process.

This viscosity stability also allows the solid content of the solution to be increased. By increasing the solid content of the solution, the amount of water applied to the film during coating is reduced. This reduction in water provides both improved control of coating weight and greater flexibility in coating speeds. Further, the applied coating, because it contains less water, is more readily dried. This reduced drying time results in an energy savings and/or a speed increase from the coating machinery. The increased solid content is also believed to facilitate the crosslinking process.

In a preferred embodiment, the aqueous solution includes from about 2% to 10% by weight of solid and, preferably, from about 4% to 6% by weight of solid. This solid content is made up from about 60% to about 90% by weight of poly(vinyl alcohol), from about 5% to 30% by weight of crosslinking agent and from about 1% to 15% by weight of catalyst.

Once the coating is applied to the substrate, the film is put through a drying oven. A typical drying oven is approximately 60 feet long and adapted to heat the film to approximately 130° C. The film is put through the oven at speeds of about 1000 feet per minute. As the film goes through the oven, the water in the applied coating is driven off which, in turn, increases the concentration of the solid content. At some point (i.e., at a particular concentration and temperature), the crosslinking process is initiated. This crosslinking process starts during the coating process and occurs rapidly and completely such that the film is substantially 100% crosslinked in three days or less. In the most preferred embodiments, the film is substantially 100% crosslinked in less than one day.

A first preferred formulation includes 100 parts of Elvanol® 90-50, 20 pphr of Parez 707 or Cymel 385 at a solid content of 4.5%. The pH is adjusted to 2.8 with phosphoric acid.

A second preferred formulation includes 100 parts of Elvanol® 90-50, 20 pphr of Parez 707 or Cymel 385 at a solid content of 4.5%. The pH is adjusted to 2.8 with maleic acid.

A third preferred formulation includes 100 parts of Elvanol® 90-50, 22.5 pphr of Cymel 385 or Parez 707 and 5 pphr of citric acid at a solid content of 5%. The pH is adjusted to 2.8 with phosphoric acid.

A fourth preferred formulation includes 100 parts of Elvanol® 90-50, 22.5 pphr of Parez 707 or Cymel 385 and 10 pphr of citric acid at a solid content of 4.5%. The pH is adjusted to 2.8 with phosphoric acid.

The resultant film structure may include an additional polymeric layer attached to the layer of crosslinked PVOH whereby the PVOH layer is sandwiched between the polymeric substrate and the additional polymeric layer. In this fashion, the crosslinked PVOH may be provided with added protection from attack by moisture and damage from rubbing. It is contemplated that this additional polymeric layer may be formed of various polyolefins and acrylics, together with other suitable polymers adapted for adherence to crosslinked PVOH.

EXAMPLES

The following examples illustrate the improved properties associated with the coating solutions of the present invention. The polypropylene substrates utilized in the examples below were corona treated and primed with poly (ethyleneimine).

Example 1

Control Sample 1 was produced by preparing a solution of Elvanol® 90-50 (100 parts), Parez 707 (20 pphr) and Ammonium Chloride (2.5 pphr) at 5.5% solid and at a pH of about 6.3. The solution was coated onto a polymeric substrate of polypropylene at a coating weight of 0.26 g/msi. Sample 1 was 0% crosslinked upon drying and exhibited an oxygen transmission rate of 0.043 cc/100 in$^2$/atm/24 hr. at 0% relative humidity.

Example 2

Control Sample 2 was produced by preparing a solution of Elvanol® 90-50 (100 parts) and glyoxal (18 pphr) at 5.5% solid and at a pH of about 4.3. The solution was coated onto a polymeric substrate of polypropylene at a coating weight of 0.24 g/msi. Sample 2 was 100% crosslinked upon drying and exhibited an oxygen transmission rate of 0.048 cc/100 in2/atm/24 hr. at 0% relative humidity.

Example 3

A 12 run fractional factorial design employing 5 factors was conducted. The factors included crosslinker level, crosslinker type, pH, acid type and temperature. An analysis of the runs showed a significant increase in crosslinking of the resultant PVOH layer with the use of hydrochloric acid as the crosslinking catalyst and with the solution pH being lowered from 4 to 3. PVOH films exhibiting 95% to 100% crosslinking upon drying were produced by coating a solution of Elvanol® 90-50 (100 parts), Parez 707 (25 pphr) and HCl at a solution pH of 3 onto a polymeric substrate of polypropylene.

Example 4

A 16 run fractional factorial design employing 5 factors was conducted. The factors included crosslinker level, crosslinker type, acid type, % solid and pH. An analysis of the runs showed a significant increase in crosslinking of the resultant PVOH layer with the use of either hydrochloric acid or nitric acid as the catalyst. These increases were particularly significant at a solution pH of 3.5 and below. Adjusting the pH upward from 3 to 4 substantially stopped the crosslinking process. PVOH films exhibiting 95% to 100% crosslinking upon drying were produced by coating a solution of Elvanol® 90-50 (100 parts), crosslinker (Parez 707 or Cymel 373) (25 pphr) and acid catalyst (HCl, HNO3) at a solution pH of 3 onto a polymeric substrate of polypropylene.

Example 5

PVOH films exhibiting 90% to 99% crosslinking upon drying were produced by coating a solution of Elvanol® 9050 (100 parts), Parez 707 (20 pphr) and maleic acid at solution pHs of from 3.4 to 2.6 onto a polymeric substrate of polypropylene.

Example 6

Tartaric acid and N-phuric acid provided no effective increase in crosslinking at solution pHs of below 3.5. PVOH films exhibiting 0% to 5% crosslinking upon drying were produced by coating a solution of Elvanol® 90-50 (100 parts), Parez 707 (20 pphr) and either tartaric acid or N-phuric acid at solution pHs of from 3.4 to 3 onto a polymeric substrate of polypropylene.

Example 7

A 16 run fractional factorial design employing 7 factors was conducted. The factors included crosslinker level, crosslinker type, acid catalyst type, second acid type, second acid level, pH, and % solid. At a pH of below 3, the solution exhibited unexpectedly stable viscosity characteristics, particularly after aging 20 hours. An analysis of the runs showed an average viscosity of 31 cps at a pH of 3.2, compared to an average viscosity of 23 cps at a pH of 2.8. The runs also showed that the addition of the second acid enhanced the oxygen barrier characteristics of the resultant PVOH layer. The films produced from the coating solutions including the second acid exhibited oxygen transmission rates as low as 0.012 cc/100 in$^2$/atm/24 hr. at 0% relative humidity.

Example 8

PVOH films exhibiting 98% to 99% crosslinking upon drying were produced by coating a solution of Elvanol® 90-50 (100 parts), Parez 707 or Cymel 3385 (20 pphr) and phosphoric acid at solution pHs of 2.8 onto a polymeric substrate of polypropylene. The solution exhibited a viscosity of from 17.8 to 20 cps after aging 20 hours, and produced a coating weight of 0.19 g/msi. The aforementioned films exhibited an oxygen transmission rate of from 0.026 to 0.028 $cc/100\ in^2/atm/24$ hr. at 0% relative humidity.

Example 9

An 18 run fractional factorial design employing 7 factors was conducted. The factors included catalyzing acid type, second acid type, pH, second acid level, % solid, crosslinker level and PVOH type. An analysis of the runs showed that the addition of a second acid such as maleic, citric or lactic acid to the coating solution at pHs of below 3 produced coating solutions exhibiting unexpectedly stable viscosity characteristics, particularly after aging 20 hours. The solution viscosity of the runs averaged 450 cps after 20 hours without the second acid, but averaged 120 cps after 20 hours with the second acid.

Example 10

PVOH films exhibiting 0% to 15% crosslinking after one day were produced by coating a solution of Elvanol® 90-50 (100 parts), Parez 707 (15–25 pphr) and sulfuric acid at solution pHs of 2.4 to 3 onto a polymeric substrate of polypropylene.

The examples set forth above show several significant improvements in the films of the present invention, as compared to films produced from earlier formulations. For example, oxygen barrier transmissive rates significantly decreased for the tested films. Particularly, the prior art formulations set forth in Examples 1 and 2 exhibited an oxygen transmissive rate of approximately 0.43 to 0.48 $cc/100\ in^2/atm/24$ hr. at 0% relative humidity, while the films of the present-invention exhibited an oxygen transmissive rate of approximately ½ such rate. The films of the present invention also exhibited improved viscosity stability, particularly with the addition of a second acid catalyst. Finally, the films of the present invention exhibited improved crosslinking characteristics upon drying. For example, prior art formulations employing a formaldehyde-containing crosslinker (Example 1) exhibited 0% crosslinking upon drying. In contrast, the films of the present invention generally exhibited from about 90% to 100% crosslinking upon drying.

Thus, while there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A polymeric film structure having an enhanced oxygen barrier produced by the process comprising:
   coating at least one side of a polymeric substrate adapted for receipt of an oxygen barrier with a solution of poly(vinyl alcohol), formaldehyde-containing crosslinking agent and crosslinking-promoting acid catalyst, said solution having a pH of about 3.5 or less, and
   wherein said acid catalyst is selected from the group consisting of phosphoric acid nitric acid and hydrochloric acid.

2. The film structure according to claim 1, wherein said solution has a pH of about 3.0 or less.

3. The film structure according to claim 1, wherein said solution includes from about 5 pphr to about 35 pphr by weight of said crosslinking agent.

4. The film structure according to claim 1, wherein said formaldehyde-containing crosslinking agent is melamine formaldehyde.

5. The film structure according to claim 1, wherein said solution further comprises a second acid catalyst.

6. The film structure according to claim 5, wherein said second acid catalyst is an organic acid selected from the group consisting of citric acid, maleic acid and lactic acid.

7. The film structure according to claim 6, wherein said solution includes from about 1 ppHr to about 15 ppHr of said second acid catalyst.

8. The film structure according to claim 1, further comprising a polymeric layer adhered to said oxygen barrier whereby said oxygen barrier is sealed between said polymeric substrate and said polymeric layer.

9. A method of producing a film structure having an enhanced oxygen barrier layer adhered thereto, comprising:
   coating at least one side of a polymeric substrate adapted for receipt of an oxygen barrier with a solution of poly(vinyl alcohol), formaldehyde-containing crosslinking agent and crosslinking-promoting acid catalyst, said solution having a pH of about 3.5 or less and
   wherein said acid catalyst is selected from the group consisting of phosphoric acid, nitric acid and hydrochloric acid.

10. The method according to claim 9, wherein said solution has a ph of about 3.0 or less.

11. The method according to claim 9, wherein said solution further comprises a second acid catalyst selected from the group consisting of citric acid, maleic acid and lactic acid.

* * * * *